US 6,639,636 B2

(12) United States Patent
Yoo et al.

(10) Patent No.: US 6,639,636 B2
(45) Date of Patent: Oct. 28, 2003

(54) LIQUID CRYSTAL DISPLAY OF DIRECT LIGHTING TYPE

(75) Inventors: Ho-Han Yoo, Yongin-si (KR); Jong-Sun Kim, Pyeongtack-si (KR); Young-Ryul Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 13 days.

(21) Appl. No.: 10/022,564

(22) Filed: Dec. 13, 2001

(65) Prior Publication Data

US 2003/0111701 A1 Jun. 19, 2003

(51) Int. Cl.[7] ............................................. G02F 1/1335
(52) U.S. Cl. ............................ 349/61; 349/58; 349/62; 349/64; 349/67
(58) Field of Search ............................ 349/58, 64, 65, 349/61, 62, 67; 361/681; 345/905

(56) References Cited

U.S. PATENT DOCUMENTS 6,330,150 B1 * 12/2001 Kim ............................ 361/683
6,407,781 B2 * 6/2002 Kitada ......................... 349/58
2002/0057405 A1 * 5/2002 Morishita et al. ........... 349/113

* cited by examiner

Primary Examiner—Eddie Lee
Assistant Examiner—Matthew C. Landau
(74) Attorney, Agent, or Firm—Cantor Colburn LLP

(57) ABSTRACT

Disclosed is a direct lighting type liquid crystal display device. A plurality of slide slots slightly larger than lamp holders are alternatively formed at both end portions of bottom chassis in the longitudinal direction concerning the bottom chassis, and lamp units are inserted into the bottom chassis. Flexible printed circuit (FPC) connecters are positioned at portions of the bottom chassis where the slide slots do not exist in order to connect the FPC connecters to control board when the FPC connecters are bent in the longitudinal direction concerning the bottom chassis. Therefore, the time for replacing a troubled lamp can be shortened and the workability for replacing the troubled lamp can be improved because the lamp unit can be drawn without separating the FPC connecters from the control board when the lamp unit including the troubled lamp is separated from the liquid crystal display device so as to replace the troubled lamp. Also, signal lines of the FPC connecters are not broken so that the reliability of the liquid crystal display device can be enhanced because the FPC connecters are not separated form the control board when the lamp unit is replaced.

6 Claims, 4 Drawing Sheets

LIQUID CRYSTAL DISPLAY OF DIRECT LIGHTING TYPE

BACKGROUND OF THE INVENTION

1. Field of the Invention

The present invention relates to a direct lighting type liquid crystal display device, and more particularly to a direct lighting type liquid crystal display device having a plurality of lamp units easily replaced by positioning flexible printed circuit (FPC) connecters electrically connecting a source printed circuit board to a control board among those lamp units.

2. Description of the Related Art

A cathode ray tube (CRT) is generally used as a display device, and applied to a television receiver, a measurement instrument, a monitor of an information display device and so on. The CRT, however, has a heavy weight and a large size so that the CRT may not applied for a display device having a small size and a light weight.

Hence, a liquid crystal display device having a thin thickness, low power consumption, and a light weight is developed for replacing the CRT. Recently, the liquid crystal display device has more developed to sufficiently display information on a larger screen so that the liquid crystal display device is utilized for monitors of a laptop computer, a desktop computer or any other display apparatuses having large screens. Thus, the demands for the liquid crystal display device is more increased.

The liquid crystal display device is a non-emissive display device which can display an image by controlling light inputted from outside. Thus, the liquid crystal display device should have a light source such as a back light assembly for applying light to a liquid crystal display panel thereof. The back light assemblies are divided into an edge type back light assembly and a direct lighting type back light assembly in accordance with positions of lamp units of the liquid crystal display device.

In the edge type back light assembly, the lamp units are installed on a side of light guiding plate which guides the light. The edge type back light assembly has lamps for emitting the light, lamp holders located end portions of the lamps for protecting the lamps, and a reflection sheet enclosing the lamps for reflecting the light emitted from the lamps into light guiding plate.

The edge type back light assembly can be applied to a liquid crystal display having small size such as the monitors of the laptop computer or the desktop computer. The edge type back light assembly has a uniform light distribution, a good durability and a thin thickness, thereby minimizing the thickness of the liquid crystal display device.

Meanwhile, the direct lighting type back light assembly is developed according as a liquid crystal display device has a screen having size of more than 20 inches. Light emitted from a plurality of lamps is directly illuminated onto a liquid crystal as display panel of a liquid crystal display device including the direct lighting type back light assembly having a diffusion plate.

The direct lighting type back light assembly has a light efficiency higher than that of the edge typed back light assembly so that the direct lighting type back light assembly can be utilized for a display apparatus having a large screen.

However, the lamps may have some troubles in comparison with the liquid crystal display device having the edge type back light assembly because many lamps are installed under the diffusion plate of the liquid crystal display device including the direct lighting type back light assembly. In the liquid crystal display device having the edge type back light assembly in which lamp units are installed on sides of the light guiding plate, only luminance of the screen is reduced when one lamp gets out of order. In the liquid crystal display device including the direct lighting type back light assembly, the image displayed on the screen is directly deteriorated when one lamp is out of order because the lamps are installed beneath the screen. As a result, the lamps of the direct lighting type back light assembly should be frequently replaced. However, time for replacing the lamp may be increased and workability for replacing the lamp may be reduced because the troubled lamp can be replaced with a new lamp after a top chassis is separated from a mold frame and a bottom chassis is also separated from the mold frame in order to replace the troubled lamp.

To overcome above-mentioned problem, there is provided a direct lighting type liquid crystal display device including at least two lamp units and slide slots at Korean Patent Application No. 1999-825. In the direct lighting type liquid crystal display device, the lamp units are separated each other and the slide slots are formed on side portions of a bottom chassis corresponding to the lamp units. The slide slots are closed with a cover. When a troubled lamp of the direct lighting liquid crystal display device is replaced, the lamp unit including the troubled lamp is drawn from the bottom chassis through the slide slots after the slide slots are separated from the bottom chassis, and then the troubled lamp is replaced with a new one. In the direct lighting type liquid crystal display device, two source printed circuit boards are installed at end portions of a liquid crystal display panel along a longitudinal direction concerning the liquid crystal display panel. First end portions of the FPC connecters are connected to the source printed circuit boards and second end portions of the FPC connecters are connected to the control board after the FPC connecters are bent toward a rear face of the bottom chassis where the control board is positioned along a side of the bottom chassis including the slide slots from the source printed circuit boards.

However, in the above-mentioned direct lighting liquid crystal display device, the workability for replacing the troubled lamp is still lowered because the FPC connecters, which electrically connect the source printed circuit boards installed in the liquid crystal display device to the control board disposed on an outside of the liquid crystal display device, and a protection plate for protecting the control board is separated from the control board so as to replace the troubled lamp with new lamp after a side cover is separated from the bottom chassis.

That is, the FPC connecters that are placed over an upper face of the side cover should be separated from the control board in order to separate the FPC connecters from the control board through the slide slots. Also, portions of signal lines of the FPC connecters may be broken at corners of a lower face of the bottom chassis where the signal lines are bent toward the control board due to a physical stress when the FPC connecters are repeatedly separated from and connected to the control board for replacing the troubled lamp.

SUMMARY OF THE INVENTION

The present invention has been made to solve the aforementioned problem, and accordingly it is an object of the present invention to provide a direct lighting type liquid crystal display device having lamp units which can be separated from a bottom chassis without separating FPC connecters from a control board, thereby improving workability for replacing the lamp units and reducing time for replacing the lamp units.

It is another object of the present invention to provide a direct lighting type liquid crystal display device preventing signal lines of the FPC connecters by physical stress.

To achieve the object of the present invention, there is provided the lamp units have a plurality of lamps, each of the lamp including a hot electrode at one end portion of the lamp and a cold electrode formed on the other end portion of the lamp, and lamp holders into which side portions of the lamp where the hot and the cold electrodes are formed are inserted for protecting the lamps. Also, slide slots larger than the lamp holders are formed at a corresponding portion to the lamp, which is selected from one width directional side and the other width directional side of the frame. Closing means for closing the slide slots are formed at the slide slots, respectively. Furthermore, one end portion of each of the flexible printed circuit boards is connected to the source printed circuit board, each of the flexible printed circuit board is bent toward a bottom face of the frame along a portion the frame where the slide slots are not formed, the portion being selected from one width directional side and the other width directional side, and the other end portion of each of the flexibly printed circuit is connected to the control board.

Preferably, lamp supporting members are formed on upper faces of the lamp holders. The lamp supporting members into which the hot portions of the lamp units are inserted enclose three sides of the lamp holders, and necking plates having heights higher than distances between bottoms of the lamp supporting members and portions of the lamp supporting members where the lamp holders are inserted and having widths wider than widths of the lamp holders are formed at sides of the lamp supporting members facing the hot electrodes in order to close the slide slots.

BRIEF DESCRIPTION OF THE DRAWINGS

The above and other objects and advantages of the present invention will become readily apparent by reference to the following detailed description when considered in conjunction with the accompanying drawings, wherein.

DETAILED DESCRIPTION OF THE PREFERRED EMBODIMENTS

Hereinafter, a direct lighting type liquid crystal display device according to the preferred embodiments of the present invention will be described in detail with reference to the accompanying drawings.

Figure 1:
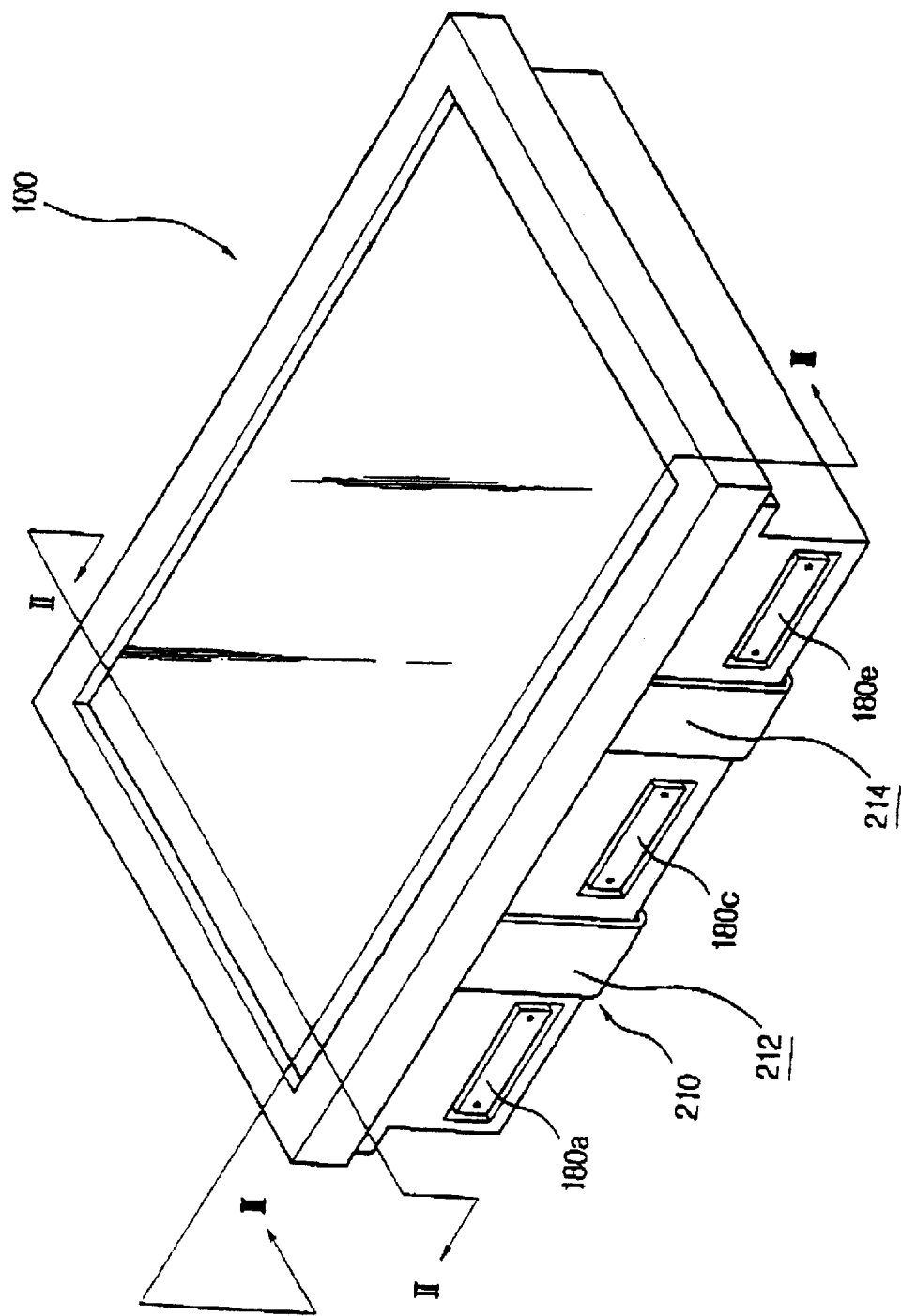
FIG. 1 is a schematic perspective view showing a liquid crystal display device according to the present invention.
Figure 2:
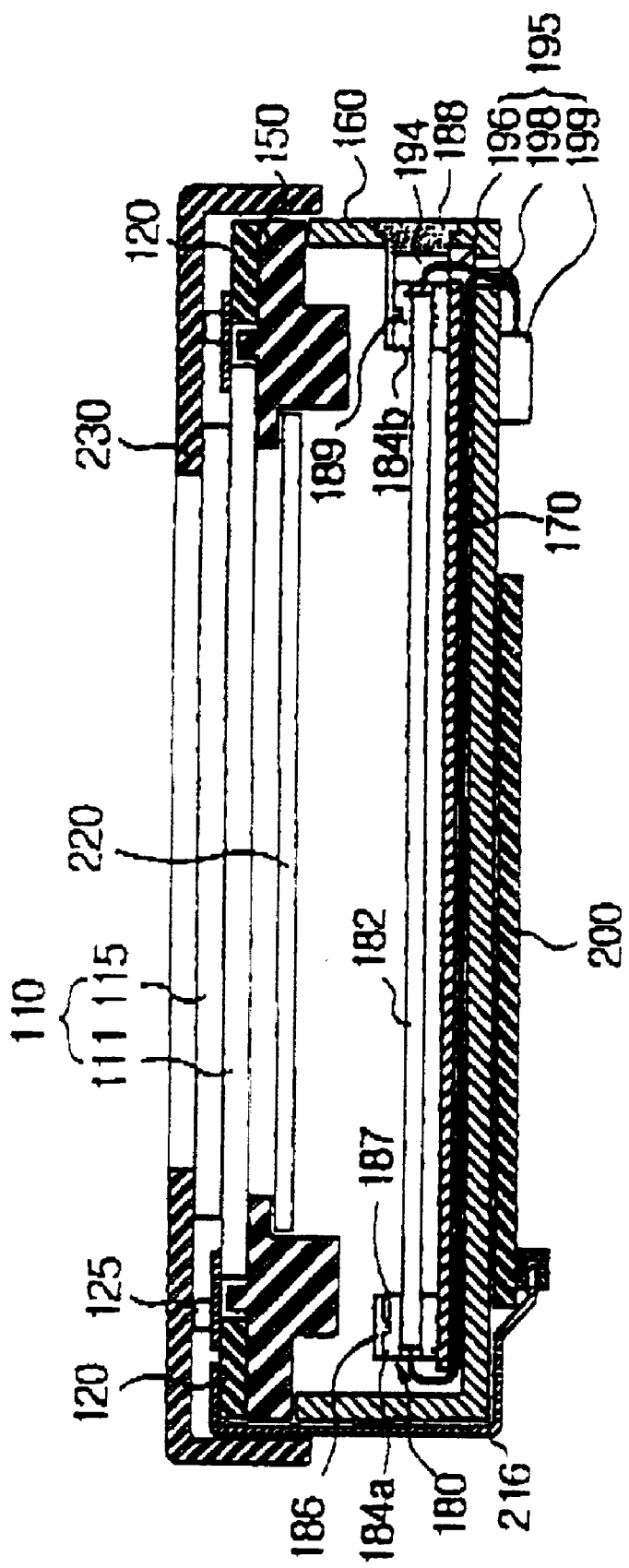
FIG. 2 is a cross-sectional view taken along line II—II of FIG. 1 illustrating the liquid crystal display device.
Figure 3:
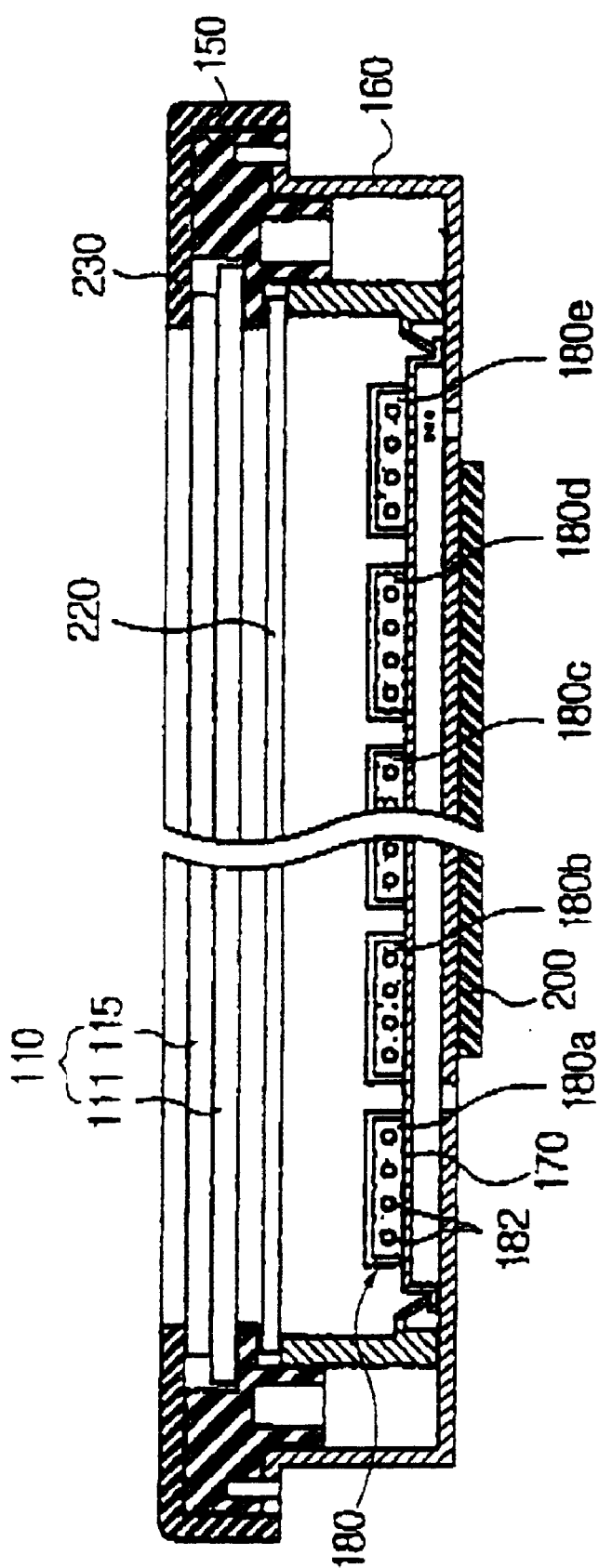
FIG. 3 is a cross-sectional view taken along line III—III of FIG. 1 illustrating the liquid crystal display device.
Figure 4:
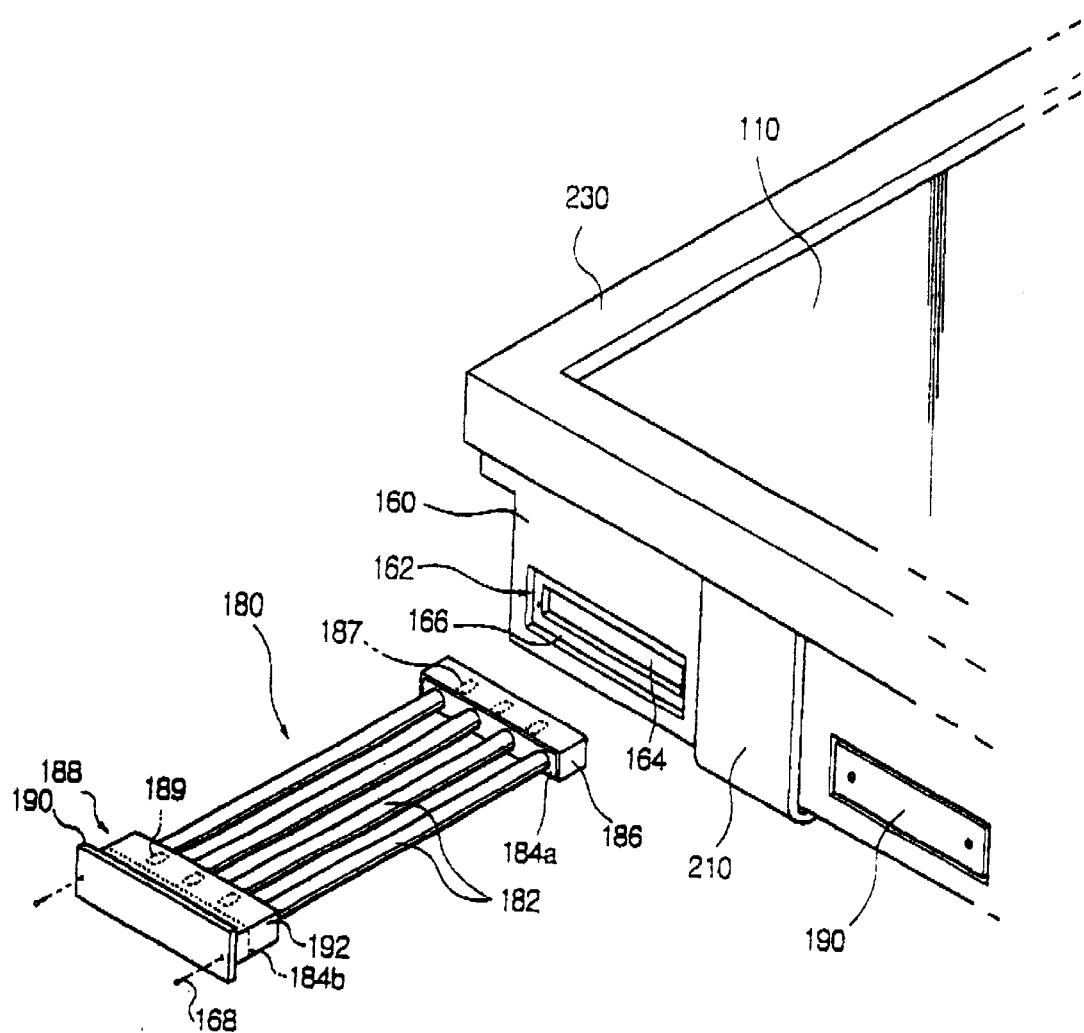
FIG. 4 is an exploded perspective view showing a lamp unit separated from a bottom chassis of the liquid crystal display device according to the present invention.

FIG. 1 is a schematic perspective view showing a liquid crystal display device according to the present invention, FIG. 2 is a cross-sectional view taken along line II—II of FIG. 1 illustrating the liquid crystal display device, FIG. 3 is a cross-sectional view taken along line III—III of FIG. 1 illustrating the liquid crystal display device, and FIG. 4 is an exploded perspective view showing a lamp unit separated from a bottom chassis of the liquid crystal display device according to the present invention.

As shown in FIGS. 2 and 3, the direct lighting type liquid crystal display device has a display unit, a back light assembly, and a control board 200. The display unit displays an image by utilizing electrical and optical properties of a liquid crystal injected therein. The back light assembly supports the display unit and supplies the display unit with a light. Also, the control board 200 is disposed an outside of the back light assembly, and the control board 200 is electrically connected to the display unit by means of a FPC connecter 210, thereby applying various control signals to the display unit.

The display unit includes a lower substrate 111, an upper substrate 115, a liquid crystal display panel 110, a printed circuit board (not shown), and a plurality of source printed circuit boards 120. The lower substrate 111 has gate lines, data lines and thin film transistors. The upper substrate 115 is attached to the lower substrate 111, and the liquid crystal display panel 110 includes a liquid crystal injected between the lower substrate 111 and the upper substrate 115. The printed circuit board is electrically connected to an end portion of the liquid crystal display panel 110 where the gate lines are formed along the longitudinal direction by means of a gate driving integrated circuit. Also, the source printed circuit boards 120 are electrically connected to the liquid crystal display panel 110 where the data lines are formed along the vertical direction by means of a source driving integrated circuit 125.

According as the size of the liquid crystal display panel 110 increases, one pair of source printed circuit boards 120 are attached to one end portion of the liquid crystal display panel 110 along the vertical direction, and another pair of source printed circuit boards 120 are attached to another end portion of the liquid crystal display panel 110 along the vertical direction.

Meanwhile, the back light assembly has a frame 150, a bottom chassis 160, a reflection plate 170, lamp units 180, a diffusion plate 220, and a top chassis 230. A penetrating hole having a rectangular shape is formed from an upper face of the frame 150 to a lower face of the frame 150, and the bottom chassis 160 is mounted beneath the lower face of the frame 150 for closing the lower face of the frame 150. The reflection plate 170 is installed on a bottom face of the bottom chassis 160 for reflecting light, and the lamp units 180 are mounted on the reflection plate 170 so as to emit the light. The diffusion plate 220 is mounted over the lamp units 180 with a predetermined interval in order to diffuse the light, and the top chassis 230 encloses from peripheral portions of the liquid crystal display panel 110 mounted on the frame 150 to lateral portions of the frame 150.

The lamp units 180 are installed in serial along the longitudinal direction of the bottom chassis 160. Because several lamp units 180 including a plurality of lamps 182 is provided, only the lamp unit 180 having a troubled lamp 182 is easily removed from the liquid crystal display device 100, and then new lamp is replaced with ease when one of a plurality of lamps 182 is out of order.

Referring to FIGS. 2 and 4, the lamp units 180 include a plurality of lamps 182, lamp holders 184a and 184b, lamp supporting members 186 and 188, and lamp driving members 195. The lamps 182 are a light source of the liquid crystal display device 100, and two lamp holders 184a and 184b are inserted to one and the other end portions of lamps 182 for protecting the lamps 182. The lamp supporting members 186 and 188 are combined with each of the lamp holders 184a and 184b in order to replace the lamps 182, and the lamp driving members 195 are electrically connected to the lamps 182 to operate the lamps 182.

Hereinafter, one lamp unit 180 having several elements will be described in order to explain the lamp unit 180 more clearly.

As shown in FIG. 2, hot electrodes where the electrical power is inputted are protruded from first end portions of the lamps 182, and cold electrodes from which the electric power is outputted are protruded from second end portions of the lamps 182. Preferably, four lamps 182 are installed in one lamp unit 180.

The lamp holders 184a and 184b into which end portions of the lamps 182 is inserted have rectangular shapes, and the lamps 182 are inserted into lamp receiving holes formed in upper faces of the lamp holder 184a and 184b. Combining holes are formed among the lamp receiving holes for combining the lamp holders 184a and 184b with the lamp supporting members 186 and 188.

A cold portion of the lamp 182 is inserted into a first lamp supporting member 186, and the first lamp supporting member 186 encloses lateral portions of the lamp holder 184a from the upper face of the lamp holder 184a along the longitudinal direction. A combining boss 187 is protruded from an inside of the first lamp supporting member 186 corresponding to the combing hole so as to prevent the lamp supporting member 186 from being separated from the lamp holder 184a by vibration or impact.

As shown in FIGS. 2 and 4, a hot portion of the lamp 182 is inserted into a second lamp supporting member 188, and the second lamp supporting member 188 encloses the lamp holder 184b besides a face of the lamp holder 184b corresponding to the first lamp supporting member 186, and a combining boss 189 is protruded from an inside of the second lamp supporting member 188 corresponding to the combining hole formed in the lamp holder 184b.

Also a necking plate 190 is formed on a lateral portion of the second lamp supporting member 188 facing the hot electrode. The necking plate 190 has a height higher than a distance from a bottom of the second lamp supporting member 188 to a portion 192 of the second lamp supporting member 188 where the lamp holder 184b is inserted. Also, the necking plate 190 has a width wider than a width of the portion 192 of the second lamp supporting member 188. The necking plate 190 prevents the lamp unit 180 from being completely inserted into the bottom chassis 160 when the lamp unit 180 is inserted from a side of the bottom chassis 160.

Preferably, the width of the portion 192 of the second lamp supporting member 188 is wider than that of the lamp holder 184b so that a gap 194 having a predetermined length is formed between the lamp holder 184b and the necking plate 190 as shown in FIG. 2. A wire 196 is drawn between the lamp holder 184a and the necking plate 190 through the gap 194.

As shown in FIG. 2, the lamp driving member 195 includes an inverter 199 and wires 196 and 198. The inverter 199 converts a direct voltage inputted from the outside into an alternating voltage, and produces the alternating voltage. The wires 196 and 198 transmit the electric power by electrically combining the inverter 199 with the electrodes of the lamps 182.

The lamp units 180 are installed in the bottom chassis 160 as shown in FIG. 1. The second lamp supporting members 188 of the lamp units 180 are periodically and alternatively installed on one portion of the bottom chassis 160 and on the other portion of the bottom chassis 160 along the longitudinal direction.

That is, when a most left-positioned lamp unit is assumed to a first lamp unit 180a and a most right-positioned lamp unit is assumed to a fifth lamp unit 180e, the second lamp supporting members 188 of the first, a third and the fifth lamp units 180a, 180c and 180e are disposed on the one portion of the bottom chassis 160 along the longitudinal direction, and the second lamp supporting members 188 of a second and a fourth lamp units 180b and 180d are disposed on the other portion of the bottom chassis 160 along the longitudinal direction as shown in FIG. 1.

In the meantime, referring to FIGS. 1 and 4, slide slots 162 are formed on the one and the other portions of the bottom chassis 160 corresponding to the second lamp supporting members 188, respectively. The lamp units 180 are easily separated from the bottom chassis 160 through the slide slots 162. Sizes of openings 164 formed in the slide slots 162 are larger than that of the first lamp supporting member 186, but smaller than that of the necking plate 190. Keeping pieces 166 are formed adjacent to the openings 164 in order to prevent the necking plate 190 from protruding from the side of the bottom chassis 160. Also, the keeping pieces 166 prevent the necking plate 190 from being inserted into the bottom chassis 160.

Namely, the necking plate 190 closes the slide slots 162.

The control board 200 is installed under the bottom chassis 160, and a protecting plate (not shown) covers the control board 200.

After one end portion of the FPC connecter 210 is connected to the source printed circuit boards 120, one end portion of the FPC connecter 210 is bent toward the bottom face of the bottom chassis 160 from the source printed circuit boards 120 along the longitudinal direction of the bottom chassis 160 where the slide slots 162 are formed. In addition, the other end portion of the FPC connecter 210 is connected to the control board 200. Thus, the FPC connecter 210 electrically connects the source printed circuit boards 120 to the control board 200.

Two FPC connecters 212 and 214 among four FPC connecters 210 are bent toward the bottom face of the bottom chassis 160 along one end of the bottom chassis 160 in the longitudinal direction as shown in FIG. 1. One FPC connecter 212 of the FPC connecters 212 and 214 is positioned between the slide slots 162 in which the first and the third lamp units 180a and 180c are inserted, and the other FPC connecter 214 is positioned between the slide slots 162 into which the third and the fifth lamp units 180c and 180e are inserted.

Other two FPC connecters 216 (one FPC connecter is not shown) are bent toward the bottom face of the bottom chassis 160 along the other end of the bottom chassis 160 in the longitudinal direction. One FPC connecter 216 of the two FPC connecters 216 (one FPC connecter is not shown) is located in a portion corresponding to the first lamp unit 180a, and the other FPC connecter is positioned between the slide slots 162 in which the second and the fourth lamp units 180b and 180d are inserted.

It will be described that a fabrication method for the liquid crystal display device and a replacement method for the lamps.

First, two end portions of the lamps 182 are inserted into the lamp receiving holes formed in each lamp holder 184a and 184b, and then the wires 196 and 198 are connected to the hot and the cold electrodes formed at the end portions of the lamps 182.

Subsequently, upper portions of a pair of the lamp holders 184a and 184b are covered with the first and the second lamp supporting members 186 and 188. The first lamp supporting member 186 covers the lamp holder 184a into which the cold portion of the lamp 182 is inserted, and the second lamp supporting member 188 covers the lamp holder 184b into which the hot portion of the lamp 182 is inserted.

In this case, combining bosses 187 and 189 formed insides of the first and the is second lamp supporting members 186 and 188 are inserted into the combining holes formed in the upper faces of the lamp holders 184a and 184b, thereby completing the combination of the lamp holders 184a and 184b with the lamp supporting members 186 and 188.

Preferably, four lamps 182 are inserted into a pair of lamp holders 184a and 184b, five lamp units 180 are installed in one liquid crystal display device 100.

Meanwhile, the reflection plate 170 is mounted on the bottom face of the bottom chassis 160 for reflecting the light emitted from the lamp unit 180 toward the diffusion plate 220.

When the reflection plate 170 is disposed on the bottom face of the bottom chassis 160, the first, the third and the fifth lamp units 180a, 180c and 180e are pushed along the other end portions of the bottom chassis 160 in the longitudinal direction so that the first, the third and the fifth lamp units 180a, 180c and 180e are inserted into the bottom chassis 160 after the lamp holders 184a where the first lamp supporting member 186 is inserted are disposed at the opening 164 of three slide slots 162 installed at the one end of the bottom chassis 160 in the longitudinal direction.

After the cold portions of the second and the fourth lamp units 180b and 180d are inserted between the slide slots 162 formed at the other end portion of the bottom chassis 160, the second and the fourth lamp units 180b and 180d are pushed toward the one end portion of the bottom chassis 160 so that five lamp units 180 are serially installed along the vertical direction of the bottom chassis 160.

At that time, the slide slots 162 are closed by the necking plate 190 of the second lamp supporting member 188 combined with the hot portions of the lamp units 180 when the five lamp units 180 are completely inserted in the bottom chassis 160.

When the liquid crystal display device 100 is vibrated to impacted, the necking plate 190 is fixed on a side of the bottom chassis 160 to prevent the lamp units 180 from being separated from the bottom chassis 160 through the slide slots 162.

The diffusion plate 220 is disposed on the lamp units 180 for diffusing the light, and then the frame 150 is installed on the diffusion plate 220 to be combined with the bottom chassis 160. The display unit to which the FPC connecters 210 are connected is mounted on the frame 150.

Subsequently, the top chassis 230 covers the upper face of the display unit and then, the top chassis 230 is combined with the frame 150 after four FPC connecters 210 connected to the printed circuit boards 120 are drawn from the bottom chassis 160.

After the FPC connecters 210 drawn from the frame 150 are positioned at portions where the slide slots 162 do not exist between the end portions of the bottom chassis 160 in the longitudinal direction of the bottom chassis 160, the FPC connecters 210 are bent toward a rear face of the bottom chassis 160 so that the FPC connecters 210 are connected to the control board 200.

After the liquid crystal display device 100 fabricated the above-mentioned method is operated, screws are separated from the necking plate 190 closing the slide slots 162 in order to separate the lamp unit 180 including a lamp 182 that does not turn-on when replacing the troubled lamp 182.

Subsequently, after the lamp unit 180 including the troubled lamp 182 is drawn from the bottom chassis 160 through the slide slots 162, the troubled lamp 182 is replaced with new lamp 182. The lamp unit 180 including the new lamp 182 is inserted into the bottom chassis 160 through the slide slots 162, and then the necking plate 190 and the bottom chassis 160 are fixed with screws 168.

When the FPC connecters 210 are positioned among the slide slots 162 as shown in FIG. 1, the troubled lamp units 180 can be drawn form the bottom chassis 160 without separating the FPC connecters 210 from the control board 200.

As it is described above, several slide slots slightly larger than the lamp holders are alternatively formed at both end portions of the bottom chassis in the longitudinal direction concerning the bottom chassis, and the lamp units are inserted into the bottom chassis. In addition, the FPC connecters are positioned at portions of the bottom chassis where the slide slots do not exist in order to connect the FPC connecters to the control board when the FPC connecters are bent in the longitudinal direction concerning the bottom chassis.

Therefore, the time demanded for replacing the troubled lamp can be reduced and the workability for replacing the troubled lamp can be increased because the lamp unit can be drawn without separating the FPC connecters from the control board when the lamp unit including the troubled lamp is separated from the liquid crystal display device so as to replace the troubled lamp.

Also, signal lines of the FPC connecters are not broken so that the reliability of the liquid crystal display device can be enhanced because the FPC connecters do not separated form the control board when the lamp unit is replaced.

What is claimed is:

1. A direct lighting type liquid crystal display device comprising:

a display unit having a liquid crystal display panel for displaying information by an electrical and art optical characteristics of a liquid crystal and at least one source printed circuit board installed on an end portion of the liquid crystal display panel for applying an electrical signal to the liquid crystal display panel;

a back light assembly having a frame including a receiving space, the display unit being mounted on the frame, a reflection plate installed beneath the receiving space for reflecting a light, a plurality of lamp units formed on the reflection plate and disposed along a longitudinal direction of the reflection plate for emitting the light, and a diffusion plate mounted over the lamp units for diffusing the light; and a control board formed beneath the frame and electrically connected to the source printed circuit board by flexible printed circuit connectors, wherein the lamp units have a plurality of lamps, each of the lamps including a hot electrode at a first end portion of each lamp and a cold electrode formed on a second end portion of each lamp, and lamp holders into which end portions, where the hot and the cold electrodes are formed, are inserted for protecting the lamps, wherein slide slots larger than the lamp holders are formed at a corresponding portion to the lamp units, the corresponding portion being selected from width directional sides of the frame, and closing means for closing the slide slots are formed at the slide slots, respectively, and wherein a first end portion of each of the flexible printed circuit connectors is connected to the source printed circuit board, each of the flexible printed circuit connectors is bent toward a bottom face of the frame along a portion of the frame where the slide slots are not formed, the portion being selected from the width directional sides of the frame, and a second end portion of each of the flexible printed circuit connectors is connected to the control board.

2. The direct lighting type liquid crystal display device of claim 1, wherein the slide slots are alternatively formed on the width directional sides of the frame in order to secure spaces for placing the flexible printed circuit connectors.

3. The direct lighting type liquid crystal display device of claim 1, wherein hot portions of the lamp units are positioned toward the slide slots.

4. The direct lighting type liquid crystal display device of claim 1, further comprising lamp supporting members enclosing the lamp holders into which the hot and cold electrodes of the lamps arc inserted, for separating the lamp units from the frame through the slide slots.

5. The direct lighting type liquid crystal display device of claim 4, wherein the closing means for closing the slide slots are the lamp supporting members enclosing the lamp holders into which the hot electrodes of the lamps are inserted.

6. The direct lighting type liquid crystal display device of claim 5, wherein the lamp supporting members enclose three sides of the lamp holders, and necking plates are formed at sides of the lamp supporting members facing the hot electrodes in order to close the slide slots, wherein each of the necking plates has a height larger than a distance between a bottom of a corresponding lamp supporting member and a portion of the corresponding lamp supporting member where a corresponding lamp holder is inserted, and a width wider than a width of the corresponding lamp holder.

* * * * *